United States Patent
Gandhi et al.

(10) Patent No.: US 11,927,236 B2
(45) Date of Patent: Mar. 12, 2024

(54) VIBRATION ISOLATION FOR ROTATING MACHINES

(71) Applicant: Toyota Motor Engineering & Manufacturing North America, Inc., Plano, TX (US)

(72) Inventors: Umesh N. Gandhi, Farmington Hills, MI (US); Paul A. Gilmore, Ann Arbor, MI (US); Ryohei Tsuruta, Ann Arbor, MI (US); Brian J. Pinkelman, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 457 days.

(21) Appl. No.: 17/156,185

(22) Filed: Jan. 22, 2021

(65) Prior Publication Data

US 2022/0196111 A1 Jun. 23, 2022

Related U.S. Application Data

(60) Provisional application No. 63/128,507, filed on Dec. 21, 2020.

(51) Int. Cl.
*F16F 15/04* (2006.01)
*F01D 25/04* (2006.01)
(Continued)

(52) U.S. Cl.
CPC ............ *F16F 15/04* (2013.01); *F16F 1/32* (2013.01); *F16F 3/00* (2013.01); *F16F 15/1215* (2013.01); *F16F 15/1336* (2013.01)

(58) Field of Classification Search
CPC .......... F16F 15/04; F16F 15/1336; F16F 1/32; F16F 3/00; F16F 15/1215; F05D 2260/96; F01D 5/10; F01D 5/16; F01D 5/26
See application file for complete search history.

(56) References Cited

U.S. PATENT DOCUMENTS

| 82,276 A | 9/1868 | Belleville et al. |
| 1,826,597 A | 10/1931 | Brecht |

(Continued)

FOREIGN PATENT DOCUMENTS

| CN | 202811955 | 3/2013 |
| CN | 104062461 A | 9/2014 |

(Continued)

OTHER PUBLICATIONS

Le et al., "A vibration isolation system in low frequency excitation region using negative stiffness structure for vehicle seat," Journal of Sound and Vibration, vol. 330, Issue 26, Dec. 19, 2011, pp. 6311-6335 (25 pages).

(Continued)

*Primary Examiner* — Thomas W Irvin
(74) *Attorney, Agent, or Firm* — Christopher G. Darrow; Darrow Mustafa PC

(57) ABSTRACT

A rotating machine system include a rotating machine. The rotating machine system can include a housing. The housing can include an inner surface. The housing can surround at least a portion of the rotating machine. The inner surface of the housing can be spaced from the rotating machine such that a space is defined therebetween. The rotating machine system can include a plurality of vibration isolators. The vibration isolators can be positioned in the space and can be operatively connected to the rotating machine and to the inner surface of the housing. The vibration isolators can be compression-type vibration isolators.

20 Claims, 9 Drawing Sheets

(51) Int. Cl.
   *F01D 25/24*       (2006.01)
   *F16F 1/32*        (2006.01)
   *F16F 3/00*        (2006.01)
   *F16F 15/121*      (2006.01)
   *F16F 15/133*      (2006.01)

(56) References Cited

U.S. PATENT DOCUMENTS

| | | |
|---|---|---|
| 2,121,835 A | 6/1938 | Sproul |
| 2,655,935 A | 10/1953 | Kinzbach |
| 2,991,655 A | 7/1961 | Jorgensen |
| 3,394,631 A | 7/1968 | Thompson |
| 3,430,942 A | 3/1969 | MacGlashan |
| 3,559,512 A | 2/1971 | Aggarwal |
| 3,574,347 A | 4/1971 | Hughes |
| 3,608,883 A | 9/1971 | Russold |
| 3,743,266 A | 7/1973 | Sturman et al. |
| 3,836,195 A | 9/1974 | Teeri |
| 3,856,242 A | 12/1974 | Cook |
| 3,858,665 A | 1/1975 | Winkler |
| 3,873,079 A | 3/1975 | Kuus |
| 3,980,016 A | 9/1976 | Taylor |
| 4,168,101 A | 9/1979 | DiGrande |
| 4,215,841 A | 8/1980 | Herring, Jr. |
| 4,351,556 A | 9/1982 | Worringer |
| 4,457,213 A | 7/1984 | Morgan |
| 4,522,447 A | 6/1985 | Snyder et al. |
| 4,530,491 A | 7/1985 | Bucksbee et al. |
| 4,612,429 A | 9/1986 | Milianowicz |
| 4,824,338 A | 4/1989 | Eickmann |
| 4,799,654 A | 6/1989 | Eickmann |
| 4,898,426 A | 2/1990 | Schulz et al. |
| 5,178,357 A | 1/1993 | Platus |
| 5,222,709 A | 6/1993 | Culley, Jr. et al. |
| 5,263,694 A | 11/1993 | Smith et al. |
| 5,310,157 A | 5/1994 | Platus |
| 5,390,903 A | 2/1995 | Fidziukiewicz |
| 5,482,351 A | 1/1996 | Young et al. |
| 5,662,376 A | 9/1997 | Breuer et al. |
| 5,669,594 A | 9/1997 | Platus |
| 5,669,598 A | 9/1997 | Ticey et al. |
| 5,747,140 A | 5/1998 | Heerklotz |
| 5,842,312 A | 12/1998 | Krumme et al. |
| 6,025,080 A | 2/2000 | Soroushian |
| 6,142,563 A | 11/2000 | Townsend et al. |
| 6,290,037 B1 | 9/2001 | Williams et al. |
| 6,354,556 B1 | 3/2002 | Ritchie et al. |
| 6,796,408 B2 | 9/2004 | Sherwin et al. |
| 6,896,324 B1 | 5/2005 | Kull et al. |
| 6,935,693 B2 | 8/2005 | Janscha |
| 6,939,097 B2 | 9/2005 | Carr et al. |
| 7,100,990 B2 | 9/2006 | Kimura et al. |
| 7,152,839 B2 | 12/2006 | Mullinix et al. |
| 7,411,331 B2 | 8/2008 | Dubowski et al. |
| 7,506,937 B2 | 3/2009 | Bequet |
| 7,661,764 B2 | 2/2010 | Ali et al. |
| 7,703,281 B2 | 4/2010 | Kosaka et al. |
| 7,717,520 B2 | 5/2010 | Boren et al. |
| 7,822,522 B2 | 10/2010 | Wereley et al. |
| 7,971,939 B2 | 7/2011 | Fujita et al. |
| 8,113,771 B2* | 2/2012 | Turnquist .............. F01D 11/025 277/411 |
| 8,166,626 B2 | 5/2012 | Sereni et al. |
| 8,181,967 B2* | 5/2012 | Feeny .................. F01D 25/183 415/173.1 |
| 8,185,988 B2 | 5/2012 | Wieland |
| 8,328,962 B2 | 12/2012 | Schussler |
| 8,366,082 B2 | 2/2013 | Evans |
| 8,585,026 B2 | 11/2013 | Dittmar |
| 8,641,045 B2* | 2/2014 | Justak .................. F01D 11/025 277/412 |
| 8,793,821 B2 | 8/2014 | Fowkes et al. |
| 8,899,393 B2 | 12/2014 | Kraner et al. |
| 8,919,751 B2 | 12/2014 | Kneidel |
| 9,045,994 B2* | 6/2015 | Bidkar .................. F16J 15/442 |
| 9,154,024 B2 | 10/2015 | Jore et al. |
| 9,194,452 B2 | 11/2015 | Hawkins et al. |
| 9,285,073 B2* | 3/2016 | Ellis ........................ F16F 1/324 |
| 9,327,847 B2 | 5/2016 | Platus |
| 9,359,908 B2* | 6/2016 | Bidkar .................... F01D 11/02 |
| 9,370,982 B2 | 6/2016 | Siuissa |
| 9,394,950 B1 | 7/2016 | Henry et al. |
| 9,399,320 B2 | 7/2016 | Johnson et al. |
| 9,408,428 B2 | 8/2016 | Gaudet |
| 9,447,839 B2 | 9/2016 | Dunning |
| 9,731,828 B2 | 8/2017 | Lichota |
| 9,791,014 B1 | 10/2017 | McKnight et al. |
| 9,920,793 B1 | 3/2018 | Churchill et al. |
| 9,994,136 B2 | 6/2018 | Nakada |
| 10,233,991 B2* | 3/2019 | Churchill ............ F16F 15/1215 |
| 10,357,955 B2 | 7/2019 | Ziolek |
| 10,371,229 B2* | 8/2019 | Gandhi .................. F16F 15/06 |
| 10,443,450 B2* | 10/2019 | Wilson ...................... F01D 5/26 |
| 10,479,246 B2* | 11/2019 | Meingast ............. B60N 2/7017 |
| 10,677,310 B2 | 6/2020 | Gandhi et al. |
| 11,021,998 B2* | 6/2021 | Ganiger ............... F16C 27/066 |
| 11,137,045 B2* | 10/2021 | Gandhi .................... F16F 1/32 |
| 11,306,619 B2* | 4/2022 | Wilson ................. F01D 11/127 |
| 11,338,711 B1* | 5/2022 | Gilmore .................. B60N 2/546 |
| 11,565,763 B1* | 1/2023 | Gilmore .................... B62J 1/02 |
| 11,603,898 B2* | 3/2023 | Schneider ................ F16F 15/06 |
| 11,603,903 B2* | 3/2023 | Gandhi .................. F01D 25/26 |
| 11,649,870 B2* | 5/2023 | Gilmore .................... F16F 3/12 267/136 |
| 11,686,361 B2* | 6/2023 | Gilmore .................... B60N 2/54 248/560 |
| 2004/0145230 A1 | 7/2004 | Snyder et al. |
| 2004/0245830 A1 | 12/2004 | Scheck et al. |
| 2006/0101803 A1 | 5/2006 | White |
| 2006/0101807 A1 | 5/2006 | Wood et al. |
| 2007/0138720 A1 | 6/2007 | Evans |
| 2007/0236071 A1 | 10/2007 | Fujita et al. |
| 2008/0181763 A1 | 7/2008 | Webster et al. |
| 2009/0025833 A1 | 1/2009 | Schussler |
| 2009/0126288 A1 | 5/2009 | Fanucci et al. |
| 2010/0001568 A1 | 1/2010 | Trybus et al. |
| 2010/0143101 A1* | 6/2010 | Fang ..................... F16J 15/3224 415/173.1 |
| 2010/0283887 A1 | 11/2010 | Topliss et al. |
| 2012/0018577 A1 | 1/2012 | Quiroz-Hernandez |
| 2012/0223483 A1* | 9/2012 | Bidkar .................. F01D 11/025 277/411 |
| 2014/0008871 A1* | 1/2014 | Bidkar .................. F16J 15/447 277/303 |
| 2014/0265468 A1 | 9/2014 | Greenhill et al. |
| 2015/0041619 A1* | 2/2015 | Ellis ........................ F16F 1/324 248/603 |
| 2015/0130220 A1 | 5/2015 | Preisler et al. |
| 2015/0285152 A1* | 10/2015 | Hayford .................... F02C 7/28 415/171.1 |
| 2015/0298580 A1 | 10/2015 | Kanai |
| 2015/0346507 A1 | 12/2015 | Howarth |
| 2016/0009156 A1 | 1/2016 | Leonard et al. |
| 2016/0032997 A1 | 2/2016 | Seepersad et al. |
| 2016/0068085 A1 | 3/2016 | Mindel et al. |
| 2016/0115825 A1* | 4/2016 | Wilson .................... F01D 5/288 248/682 |
| 2017/0009601 A1 | 1/2017 | Szwedowicz et al. |
| 2017/0158104 A1 | 6/2017 | Le et al. |
| 2018/0195570 A1 | 7/2018 | Churchill et al. |
| 2018/0195571 A1* | 7/2018 | Churchill .................. F16F 3/02 |
| 2018/0312086 A1* | 11/2018 | Meingast ............. B60N 2/7017 |
| 2019/0186588 A1 | 6/2019 | Gandhi et al. |
| 2019/0186589 A1 | 6/2019 | Gandhi et al. |
| 2019/0331003 A1* | 10/2019 | Wilson ...................... F01D 5/26 |
| 2021/0107623 A1 | 4/2021 | Barrett et al. |
| 2022/0145957 A1* | 5/2022 | Gilmore .................. B60N 2/54 |
| 2022/0145958 A1* | 5/2022 | Gilmore .................... F16F 3/12 |
| 2022/0299083 A1* | 9/2022 | Gilmore .................. F16F 3/026 |

(56) References Cited

U.S. PATENT DOCUMENTS

2023/0219646 A1\* 7/2023 Gilmore .................. B62J 1/065
                                                             280/281.1

FOREIGN PATENT DOCUMENTS

| CN | 204774820 | U  | 11/2015 |
|----|-----------|----|---------|
| CN | 103147511 | B  | 4/2016  |
| CN | 108240415 | A  | 7/2018  |
| CN | 108757799 | A  | 11/2018 |
| CN | 109540493 | A  | 3/2019  |
| CN | 109932805 | A  | 6/2019  |
| DE | 102010003594 | A1 | 10/2011 |
| JP | H0614980  | U  | 2/1994  |
| JP | 2011201378 |    | 10/2011 |
| WO | 2014180009 | A1 | 11/2014 |

OTHER PUBLICATIONS

Lee et al., "A multi-stage high-speed railroad vibration isolation system with "negative" stiffness," Journal of Sound and Vibration, vol. 331, Issue 4, Feb. 13, 2012, pp. 914-921 (8 pages).

Lee et al., "Position control of seat suspension with minimum stiffness," Journal of Sound and Vibration, vol. 292, Issues 1-2, Apr. 25, 2006, pp. 435-442 (8 pages).

Carrella et al., "Demonstrator to show the effects of negative stiffness on the natural frequency of a simple oscillator," Proceedings of the Institution of Mechanical Engineers, Part C: Journal of Mechanical Engineering Science, Jul. 14, 2008, pp. 1189-1192 (4 pages).

Le et al., "Experimental investigation of a vibration isolation system using negative stiffness structure," International Journal of Mechanical Sciences, vol. 70, May 2013, pp. 99-112 (14 pages).

Shan et al., "Rigidity-tuning conductive elastomer," Smart Materials and Structures, 2015, pp. 1-9 (10 pages).

Correa et al., "Mechanical design of negative stiffness honeycomb materials," Integrating Materials and Manufacturing Innovation, 2015, pp. 1-11 (11 pages).

Ferguson-Pell, "Seat Cushion Selection," JRRD Clinical Supplement No. 2: Choosing a Wheelchair System, pp. 49-73 (25 pages).

Williams et al., "Dynamic modelling of a shape memory alloy adaptive tuned vibration absorber," Journal of Sound and Vibration 280, Dec. 4, 2003, pp. 211-234 (24 pages).

Araki et al., "Integrated mechanical and material design of quasi-zero stiffness vibration isolator with superelastic Cu-Al-Mn shape memory alloy bars," Journal of Sound and Vibration, Dec. 2015, pp. 1-19 (34 pages).

Casciati et al., "Performance of a base isolator with shape memory alloy bars," Earthquake Engineering and Engineering Vibration, vol. 6, No. 4, Dec. 2007, pp. 401-408 (8 pages).

Morsch et al., "Design of a Generic Zero Stiffness Compliant Joint," Proceedings of the ASME 2010 International Design Engineering Technical Conferences & Computers and Information in Engineering Conference, Aug. 15-18, 2010, pp. 1-9 (10 pages).

Miga Motor Company, "Miga AdrenaLine—A Space Age Wire," retrieved from the Internet: < https://migamotors.com/index.php?main_page=product_info&cPath=1&products_id=37>, [retrieved Mar. 26, 2021] (1 page).

Furukawa Techno Material, "Shape Memory Alloys & Super-elastic Alloys," retrieved from the Internet: <https://www.furukawa-ftm.com/english/nt-e/product.htm>, [retrieved Mar. 26, 2021] (3 pages).

\* cited by examiner

VIBRATION ISOLATION FOR ROTATING MACHINES

CROSS-REFERENCE TO RELATED APPLICATIONS

This application claims the benefit of U.S. Provisional Application No. 63/128,507, filed on Dec. 21, 2020, which is incorporated herein by reference in its entirety.

FIELD

The subject matter described herein relates in general to rotating machines and, more particularly, to vibration reduction in rotating machines.

BACKGROUND

Rotating machines are used for converting one type of energy input into a different type of energy output. Rotating machines are used in various applications, such as rotating vehicle wheels, generating energy from natural resources, and powering everyday appliances. Examples of rotating machines include motors and turbines.

SUMMARY

In one respect, the present disclosure is directed to a rotating machine system. The rotating machine system can include a rotating machine. The rotating machine system can include a housing. The housing can include an inner surface. The housing can surround at least a portion of the rotating machine. The inner surface of the housing can be spaced from the rotating machine such that a space is defined between them. The rotating machine can include a plurality of vibration isolators. The vibration isolators can be positioned in the space and be operatively connected to the rotating machine and to the inner surface of the housing. The plurality of vibration isolators can be compression-type isolators.

In another respect, the present disclosure is directed to a rotating machine system. The rotating machine system can include a rotating machine. The rotating machine system can include a housing. The housing can include an inner surface. The housing can surround at least a portion of the rotating machine. The inner surface of the housing can be spaced from the rotating machine such that a space is defined between them. The rotating machine can include a plurality of vibration isolators. The vibration isolators can be positioned in the space and be operatively connected to the rotating machine and to the inner surface of the housing. The plurality of vibration isolators can be compression-type isolators. The compression-type isolators can be configured to compress at a substantially constant crush force in response to a force applied by the rotating machine. The compression-type isolators can be stacks of conical springs, or the compression-type isolators can be bi-stable structures.

DETAILED DESCRIPTION

Figure 1:
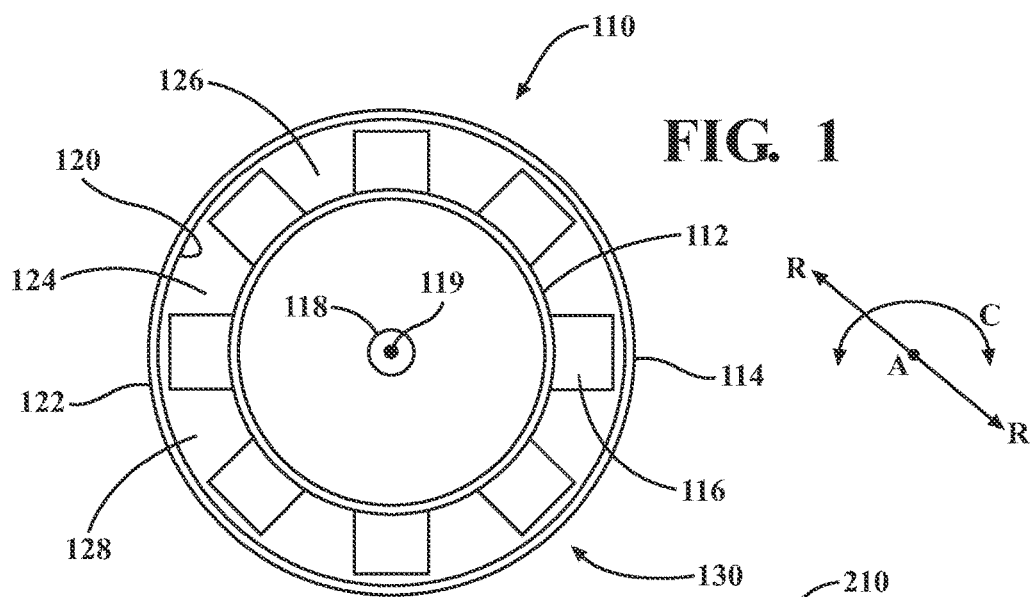
FIG. 1 is an example of a rotating machine system.

The high speed rotation of a rotating machine can cause the components of the rotating machine to vibrate. Other causes of vibration in rotating machines can include wear and tear on and/or misalignment of the components of the rotating machine and/or bearing malfunctions, to name a few examples. Over time, vibration in rotating machines can cause mechanical failures within the rotating machine. Accordingly, this detailed description relates to vibration isolation for rotating machines.

A rotating machine system can include a rotating machine and a housing. The housing can include an inner surface, and the housing can surround at least a portion of the rotating machine. The inner surface of the housing can be spaced from the rotating machine such that a space is defined therebetween. The rotating machine system can include a plurality of vibration isolators positioned in the space and operatively connected to the rotating machine and to the inner surface of the housing. The plurality of vibration isolators can reduce vibration in the rotating machine system.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-16, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Referring to FIG. 1, an example of at least a portion of a rotating machine system 110 is shown. Some of the possible elements of the rotating machine system 110 are shown in FIG. 1 and will now be described. It will be understood that it is not necessary for the rotating machine system 110 to have all of the elements shown in FIG. 1 or described herein. Further, it will be appreciated that the rotating machine system 10 can have alternative and/or additional elements to those shown in FIG. 1.

The rotating machine system 110 can include a rotating machine 112, a housing 114, and a plurality of vibration isolators 116. The various elements of the rotating machine system 110 can be operatively connected to each other (or any combination thereof). As used herein, the term "operatively connected" can include direct or indirect connections, including connections without direct physical contact. Each of the above noted elements of the rotating machine system 110 will be described in turn below. The rotating machine 112 can be any suitable rotating machine, including a motor, a turbine, or a generator, just to name a few examples. The rotating machine 112 can include one or more stationary components and one or more rotating components. In some arrangements, the rotating machine can include a stator, rotor, and/or central shaft 118. The rotating machine 112 can be configured to rotate at a high rate. The rotating machine 112 can have an axis of rotation 119.

The rotating machine system 110 can include a housing 114. At least a portion of the rotating machine 112 can be located within the housing 114, which can protect the rotating machine 112 or one or more components thereof. The housing 114 can include an inner surface 120 and an outer surface 122. The housing 114 can be substantially cylindrical in shape, but the housing 114 can be any other suitable shape. In some arrangements, the inner surface 120 can be substantially cylindrical in shape, but other suitable shapes for the inner surface 120 are possible.

The inner surface 120 can surround at least a portion of the rotating machine 112. The housing 114 can be spaced from the rotating machine 112 such that there is a space 124 between the rotating machine 112 and the inner surface 120. The space 124 can have an upper region 126 and a lower region 128. The terms "upper" and "lower" are used for convenience to indicate the relative location of the region in the operative position of the rotating machine system 110. The space 124 can be substantially constant in one or more directions. For example, the space 124 can be substantially constant in the axial direction A, a circumferential direction C, and/or a radial direction R. The axial direction A can be a direction that is coaxial with and/or substantially parallel to the axis of rotation 119. The axial direction A can be represented by point A in FIG. 1, and it extends in a direction into and/or out of the page. The circumferential direction C can be the direction about the axis of rotation 119. The radial direction R can be any direction extending substantially radially outward from the axial direction A toward the inner surface 120.

The rotating machine system 110 can include a plurality of vibration isolators 116. As described herein, the plurality of vibration isolators 116 can be compression-type vibration isolators 116. As described herein, a compression-type vibration isolator can be a vibration isolator that is configured to compress in response to an applied stress, load, and/or force. The compression-type vibration isolators 116 can be positioned in the space 124 between the rotating machine 112 and the inner surface 120. The compression-type vibration isolators 116 can be operatively connected to the rotating machine 112 and to the inner surface 120. In some arrangements, the compression-type vibration isolators 116 can be pre-compressed.

The compression-type vibration isolators 116 can be operatively connected to the rotating machine 112 and to the inner surface 120 in any suitable manner. For example, the compression-type vibration isolators 116 can be operatively connected to the rotating machine 112 and to the inner surface 120 by fasteners, adhesives, welds, mechanical engagement, and/or any combination thereof.

Figure 2:
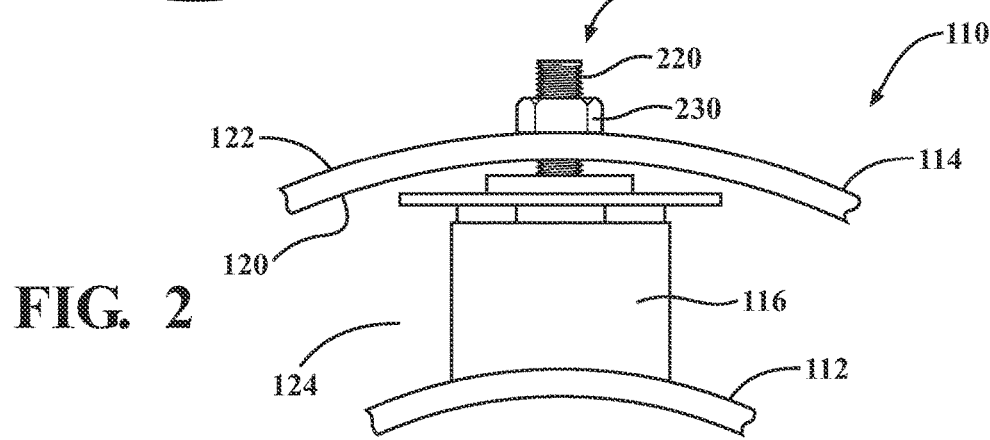
FIG. 2 is an example of a portion of the rotating machine system, showing an example of an operative connection of a vibration isolator to a housing and to a rotating machine.

Referring to FIG. 2, the rotating machine system 110 can, in one or more examples, include a plurality of fasteners 210 arranged in the circumferential direction C about the housing 114. In this example, the fasteners 210 can include bolts 220. The bolts 220 can be any suitable type of bolt. The bolts 220 can pass through apertures in the housing 114. Retention members 230 can engage the bolts 220 on the outer surface 122 to retain the bolts 220 in place. In one example, the retention members 230 can be nuts, but can be any other suitable retention members.

The compression-type vibration isolators 116 can be positioned in the space 124 and operatively connected to the rotating machine 112 and to the inner surface 120 in any suitable arrangement. In one or more arrangements, as shown in FIG. 1, the rotating machine system 110 can include 8 compression-type vibration isolators 116. In other arrangements, the rotating machine system 110 can include 4, 5, 6, 7, 8, 9, 10, 11 12, or any other suitable number of compression-type vibration isolators 116.

Figure 3:
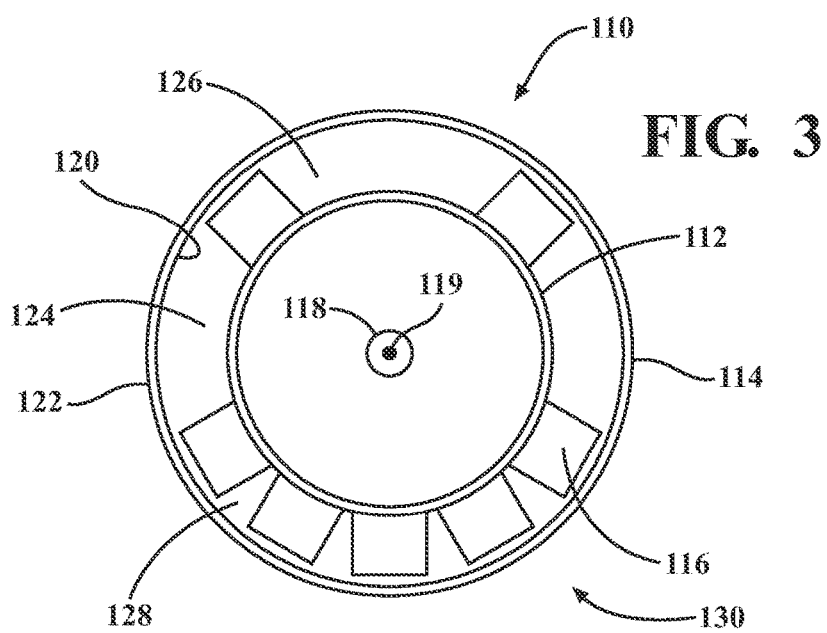
FIG. 3 is an example of an arrangement of compression-type vibration isolators in a rotating machine.

As shown in FIG. 1, the compression-type vibration isolators 116 can be distributed within the space 124 substantially uniformly in the circumferential direction C. As such, the compression-type vibration isolators 116 can be substantially equally spaced. Alternatively, the compression-type vibration isolators 116 can be distributed within the space 124 non-uniformly in the circumferential direction C, as shown in FIG. 3. For example, the rotating machine system 110 can include a greater concentration of compression-type vibration isolators 116 in the lower region 128 of the space 124 compared to the upper region 126 of the space 124. The distribution of the compression-type vibration isolators 116 within the space 124 can vary based on one or more characteristics of the rotating machine 112. For example, a non-uniform arrangement of compression-type vibration isolators 116 can be helpful in order to account for the load caused by the weight of the rotating machine 112.

The compression-type vibration isolators 116 can be operatively connected to the rotating machine 112 and to the inner surface 120 such that the compression-type vibration isolators 116 form a row 130 substantially in the circumferential direction C about the rotating machine 112. The row 130 of compression-type vibration isolators 116 can be substantially perpendicular relative to the axial direction A of the rotating machine 112.

In some arrangements, the rotating machine system 110 can include a plurality of rows 130 of compression-type vibration isolators 116. The plurality of rows 130 can be spaced from each other along the axis of rotation 119 or the axial direction A of the rotating machine 112. In some arrangements, the plurality of rows 130 can be substantially equally spaced in the axial direction A. In some arrangements, one or more of the rows 130 can be non-equally spaced from the other rows 130 in the axial direction A. The rows 130 can be substantially identical to each other (e.g., quantity, type, and/or distribution of the compression-type vibration isolators), or one or more rows 130 can be different from the other rows 130.

In one or more arrangements, the compression-type isolators 116 can be operatively connected to the rotating machine 112 and to the inner surface 120 such that the compression-type vibration isolators 116 are pre-compressed. As such, the rotating machine 112 can be suspended within the housing 114 by the compression-type vibration isolators 116. The compression of the compression-type vibration isolators 116 can be varied in any suitable manner. In one example, the compression-type vibration isolators 116 can be pre-compressed before they are operatively connected to the rotating machine 112 and to the inner surface 120. In another example, the compression-type vibration isolators 116 can be operatively connected to the rotating machine 112 and to the inner surface 120 before being compressed. In this example, the compression-type vibration isolators 116 can be pre-compressed, for example, by adjusting the fasteners 210 and/or by manual compressing.

The compression-type vibration isolators 116 can be any suitable compression-type vibration isolators 116, now known or later developed. In one example, the compression-type vibration isolators 116 can be stacks of conical springs 600, as described in connection with FIGS. 4-11. In another example, the compression-type vibration isolators 116 can be bi-stable structures 1200, as described in connection with FIGS. 12-16. Each compression-type vibration isolator 116 will be described in turn below.

As described in connection with FIGS. 4-11, the compression-type isolators 116 can be stacks of conical springs 600. It should be noted that other terms can be used to describe the conical springs 600 such as Belleville washers, disk springs, conical disks, etc.

Figure 6:
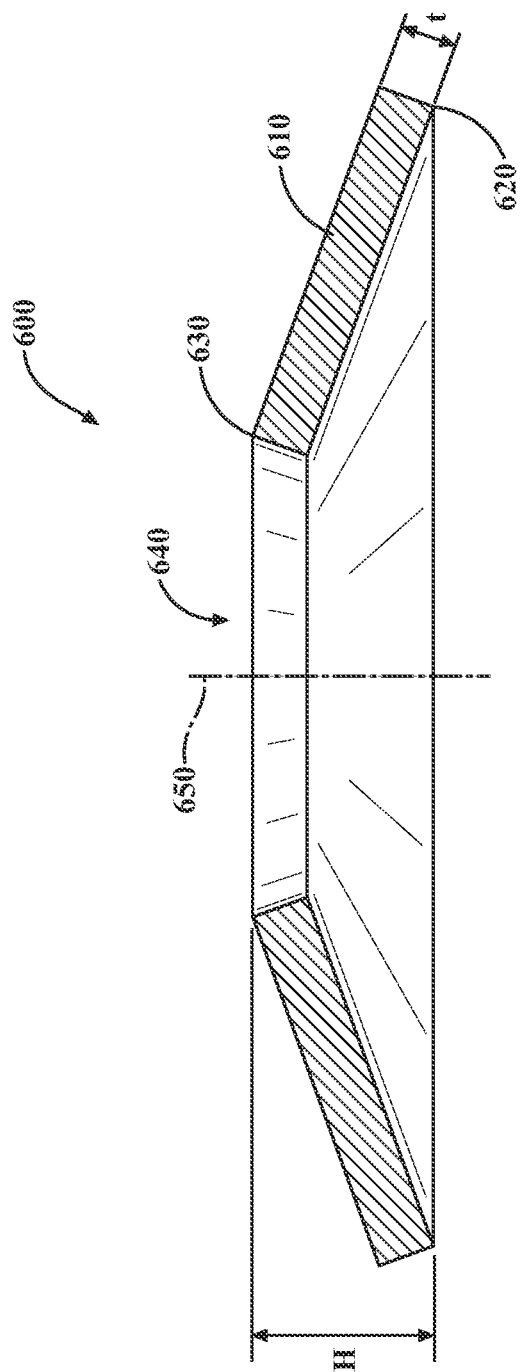
FIG. 6 is an example of a conical spring.

Referring to FIG. 6, an example of a conical spring 600 is shown. The conical spring 600 can have a body 610 with a substantially conical shape. The conical spring 600 can include an outer diameter body portion 620 and an inner diameter body portion 630. The outer diameter body portion 620 can be larger than the inner diameter body portion 630. The conical spring 600 can have a central aperture 640. The conical spring 600 can have a central axis 650. The conical spring 600 can have a height H and a thickness t. In some arrangements, the conical spring 600 can have a ratio of the height H to the thickness t of about 1 to about 2, about 1.2 to about 1.8, about 1.3 to about 1.5. In some arrangements, the ratio of the height H to the thickness t can be about 1.41.

A plurality of the conical springs 600 can be arranged in any suitable manner in a stack. For example, in one or more arrangements, the plurality of the conical springs 600 can be arranged in an alternating pattern. In this example, the outer diameter body portion 620 of one conical spring 600 can face the outer diameter body portion 620 of a neighboring conical spring 600. Alternatively or additionally, the inner diameter body portion 630 of a conical spring 600 can face the inner diameter body portion 630 of a neighboring conical spring 600. The central apertures 640 of the conical springs 600 can be substantially aligned with each other.

In some arrangements, the stack of the plurality of conical springs 600 does not include a central shaft that passes through the central apertures 640 of the plurality of conical springs 600. Alternatively or additionally, the plurality of conical springs 600 does not include an outer sleeve that encloses the plurality of conical springs 600. However, in other arrangements, the stack of the plurality of conical springs 600 can include a central shaft and/or an outer sleeve.

There are numerous ways in which the plurality of conical springs 600 can be arranged in a stack. Two examples will be provided herein. However, it will be understood that arrangements are not limited to the two examples described herein.

Figure 7:
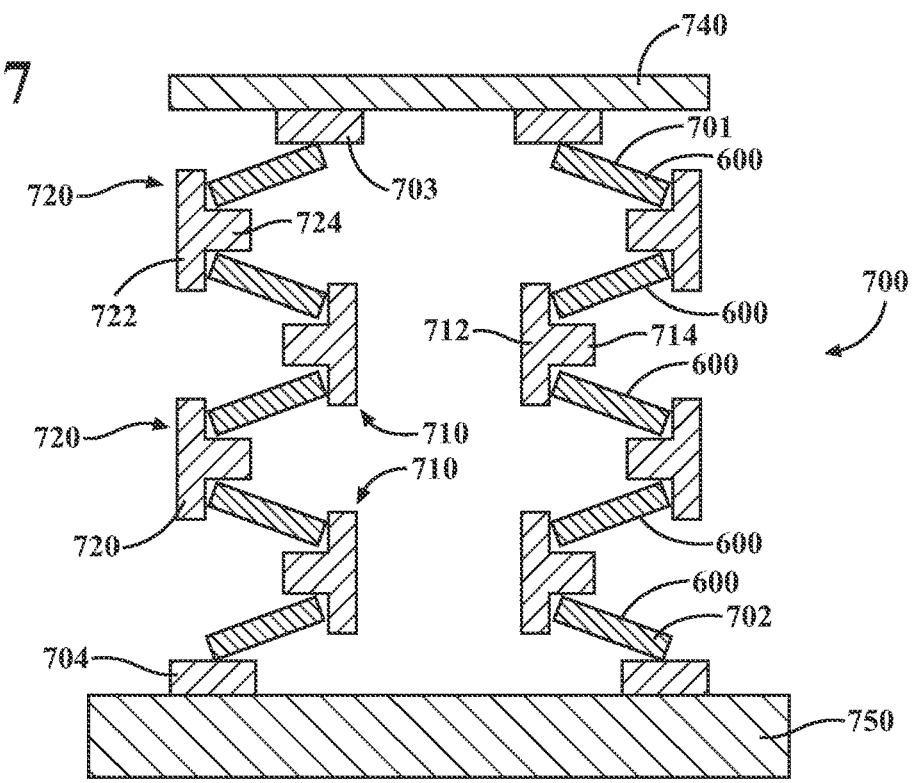
FIG. 7 is a cross-sectional view of a first example of the stack of conical springs.

Referring to FIG. 7, a first example of the stack 700 of conical springs 600 is shown in a cross-sectional view. As such, the compression-type vibration isolators 116 can include a plurality of the conical springs 600 arranged in stacks 700. The stack 700 of the plurality of the conical springs 600 can have a first outermost conical spring 701 and a second outermost conical spring 702.

The stack 700 of conical springs 600 can further include a plurality of inner spacers 710 and a plurality of outer spacers 720. The inner spacers 710 can separate the inner diameter body portion 630 of neighboring pairs of the conical springs 600. The outer spacers 720 can separate the outer diameter body portion 620 of neighboring pairs of the conical springs 600. In some arrangements, the plurality of inner spacers 710 can be substantially identical to each other. In other arrangements, at least one of the inner spacers 710 can be different from the other inner spacers 710 in or more respects. In some arrangements, the plurality of outer spacers 720 can be substantially identical to each other. In other arrangements, at least one of the outer spacers 720 can be different from the other outer spacers 720 in or more respects.

The inner spacers 710 and the outer spacers 720 can be generally cylindrical members. In one or more arrangements, the inner spacers 710 and the outer spacers 720 can have a substantially t-shaped cross-sectional shape. Thus, the inner spacers 710 can include an inner wall portion 712 and a transverse ledge portion 714. The transverse ledge portion 714 can extend outwardly from the inner wall portion 712. The transverse ledge portion 714 can be substantially perpendicular to the inner wall portion 712. The outer spacers 720 can include an outer wall portion 722 and a transverse ledge portion 724. The transverse ledge portion 724 can extend inwardly from the outer wall portion 722. The transverse ledge portion 724 can be substantially perpendicular to the outer wall portion 722.

The inner spacers 710 and the outer spacers 720 can be configured as non-locking spacers. Thus, the outer diameter body portion 620 of the conical springs 600 can rest on or contact the transverse ledge portion 724 of the outer spacers 720. Similarly, the inner diameter body portion 630 can rest on or contact the transverse ledge portion 714 of the inner spacers 710. Thus, the inner spacers 710 and the outer spacers 720 do not lockingly engage the conical springs 600.

The stack 700 of conical springs 600 can include a first endcap 740 and a second endcap 750. The first endcap 740 can be operatively connected to and/or operatively positioned with respect to the first outermost conical spring 701 at a first end of the stack 700. In some arrangements, one or more intermediate structures 703 can be located between the first endcap 740 and the first outermost conical spring 701. In other arrangements, the first endcap 740 and the first outermost conical spring 701 can directly contact each other. The second endcap 750 can be operatively connected to and/or operatively positioned with respect to the second outermost conical spring 702 at a second end of the stack 700. In some arrangements, one or more intermediate structures 704 can be located between the second endcap 750 and the second outermost conical spring 702. In other arrangements, the second endcap 750 and the second outermost conical spring 702 can directly contact each other.

In some arrangements, the first endcap 740 and the second endcap 750 can be substantially identical to each other. In other arrangements, the first endcap 740 and the second endcap 750 can be different from each other in one or more respects. The first endcap 740 and the second endcap 750 can be made of any suitable material.

FIG. 7 shows the conical springs 600 in the stack 700 as being in a neutral position. However, as will be explained in more detail later, the stack of conical springs 600 can be configured to allow the conical springs 600 in the stack 700 to become flat or even inverted.

Figure 8:
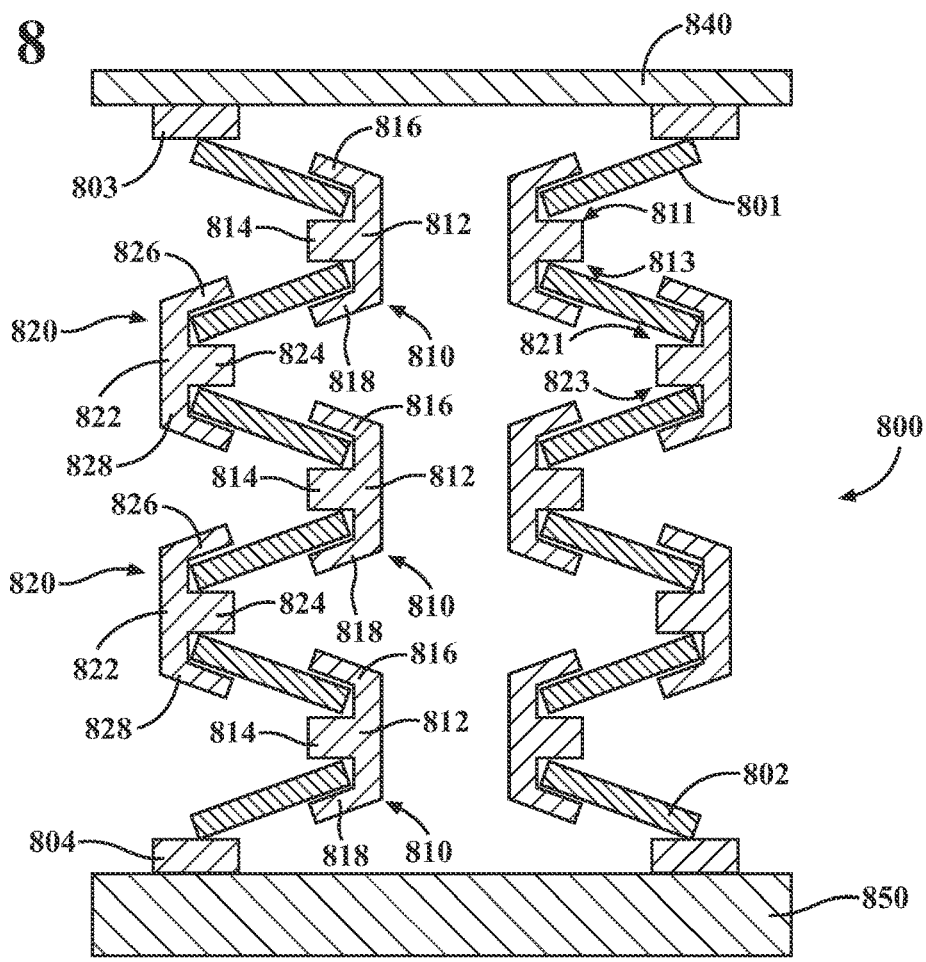
FIG. 8 is a cross-sectional view of a second example of the stack of conical springs.

Referring to FIG. 8, a second example of the stack of conical springs 600 is shown in a cross-sectional view. The stack of conical springs 600 can include a plurality of the conical springs 600 arranged in a stack 800. The stack 800 of the plurality of the conical springs 600 can have a first outermost conical spring 801 and a second outermost conical spring 802.

The stack 800 of conical springs 600 can further include a plurality of inner spacers 810 and a plurality of outer spacers 820. The inner spacers 810 can separate the inner diameter body portion 630 of neighboring pairs of the conical springs 600. The outer spacers 820 can separate the outer diameter body portion 620 of neighboring pairs of the conical springs 600. In some arrangements, the plurality of inner spacers 810 can be substantially identical to each other. In other arrangements, at least one of the inner spacers 810 can be different from the other inner spacers 810 in or more respects. In some arrangements, the plurality of outer spacers 820 can be substantially identical to each other. In other arrangements, at least one of the outer spacers 820 can be different from the other outer spacers 820 in or more respects.

The inner spacers 810 and the outer spacers 820 can be generally cylindrical members. In one or more arrangements, the inner spacers 810 and the outer spacers 820 can have a substantially E-shaped or a substantially 3-shaped cross-sectional shape. Thus, the inner spacers 810 can include an inner wall portion 812, a central transverse ledge portion 814, an upper transverse ledge portion 816, and a lower transverse ledge portion 818. It will be appreciated that the terms "upper" and "lower" are used for convenience in this respect relative to the orientation of the inner spacers 810 shown in FIG. 8. However, it will be appreciated that the upper transverse ledge portion 816 and the lower transverse ledge portion 818 may not actually be above or below the central transverse ledge portion 814 depending on the orientation of the stack 800. A first groove 811 can be defined by the inner wall portion 812, the central transverse ledge portion 814, and the upper transverse ledge portion 816. A second groove 813 can be defined by the inner wall portion 812, the central transverse ledge portion 814, and the lower transverse ledge portion 818.

The central transverse ledge portion 814 can extend outwardly from the inner wall portion 812. The central transverse ledge portion 814 can be substantially perpendicular to the inner wall portion 812. In some arrangements, the upper transverse ledge portion 816 and the lower transverse ledge portion 818 can be non-parallel to the central transverse ledge portion 814. In some arrangements, the upper transverse ledge portion 816 and the lower transverse ledge portion 818 can be non-parallel to each other.

The outer spacers 820 can include an outer wall portion 822, a central transverse ledge portion 824, an upper transverse ledge portion 826, and a lower transverse ledge portion 828. Again, the terms "upper" and "lower" are used merely for convenience in this respect relative to the orientation of the inner spacers 810 shown in FIG. 8. A first groove 821 can be defined by the outer wall portion 822, the central transverse ledge portion 824, and the upper transverse ledge portion 826. A second groove 823 can be defined by the outer wall portion 822, the central transverse ledge portion 824, and the lower transverse ledge portion 828.

The central transverse ledge portion 824 can extend outwardly from the outer wall portion 822. The central transverse ledge portion 824 can be substantially perpendicular to the outer wall portion 822. In some arrangements, the upper transverse ledge portion 826 and the lower transverse ledge portion 828 can be non-parallel to the central transverse ledge portion 824. In some arrangements, the upper transverse ledge portion 826 and the lower transverse ledge portion 828 can be non-parallel to each other.

The inner spacers 810 and the outer spacers 820 can be configured as locking spacers. The outer diameter body portion 620 of the conical springs 600 can be received in one of the first groove 821 and the second groove 823 of the outer spacer 820. Thus, the outer diameter body portion 620 of the conical springs 600 can be lockingly engaged by and/or retainably received in the respective one of the first groove 821 and the second groove 823 of the outer spacer 820. Similarly, the inner diameter body portion 630 of the conical springs 600 can be received in one of the first groove 811 and the second groove 813 of the inner spacer 810. Thus, the inner diameter body portion 630 of the conical springs 600 can be lockingly engaged by and/or retainably received in the respective one of the first groove 811 and the second groove 813 of the inner spacer 810.

The stack 800 can includes a first endcap 840 and a second endcap 850. The first endcap 840 can be operatively connected to and/or operatively positioned with respect to the first outermost conical spring 801 at a first end of the stack 800. In some arrangements, one or more intermediate structures 803 can be located between the first endcap 840 and the first outermost conical spring 801. In other arrangements, the first endcap 840 and the first outermost conical spring 801 can directly contact each other. The second endcap 850 can be operatively connected to and/or operatively positioned with respect to the second outermost conical spring 802 at a second end of the stack 800. In some arrangements, one or more intermediate structures 804 can be located between the second endcap 850 and the second outermost conical spring 802. In other arrangements, the second endcap 850 and the second outermost conical spring 802 can directly contact each other.

In some arrangements, the first endcap 840 and the second endcap 850 can be substantially identical to each other. In other arrangements, the first endcap 840 and the second endcap 850 can be different from each other in one or more respects. The first endcap 840 and the second endcap 850 can be made of any suitable material.

FIG. 7 shows an example in which the inner spacers 710 and the outer spacers 720 are non-locking spacers, and FIG. 8 shows an example in which the inner spacers 810 and the outer spacers 820 are locking spacers. However, it will be understood that arrangements described herein are not limited in this regard. Indeed, the stacks 700, 800 of conical springs 600 can use any combination of locking and non-locking spacers for the inner spacers 710, 810 and/or the outer spacers 720, 820. For example, the inner spacers 710, 810 can be locking spacers, and the outer spacers 720, 820 can be non-locking spacers, or vice versa. As another example, the inner spacers 710, 810 can be all locking spacers, all non-locking spacers, or any combination of locking spacers and non-locking spacers. Similarly, the outer spacers 720, 820 can be all locking spacers, all non-locking spacers, or any combination of locking spacers and non-locking spacers.

Further, it will be appreciated that the above-described stacks of conical springs are not the only configurations that can be used. Indeed, additional examples of the isolators can include any of those disclosed in U.S. Pat. Nos. 10,371,229 and 10,677,310 as well as U.S. Patent Publ. No. 2019//0186589, which are incorporated herein by reference in their entireties.

Figure 4:
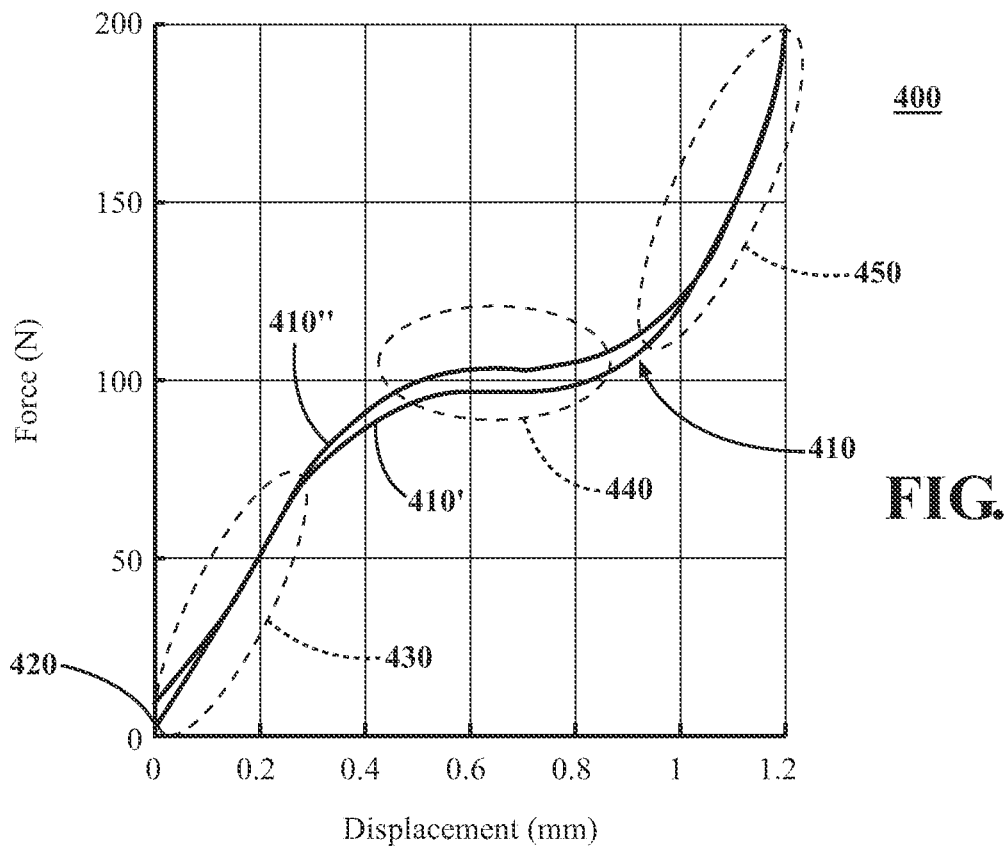
FIG. 4 is an example of a force-displacement graph of a stack of conical springs.

The stack 700, 800 of conical springs 600 can be configured to exhibit a non-linear stiffness profile. The non-linear stiffness profile can include a region of quasi-zero stiffness. An example of a force-displacement graph 400 for the stack 700, 800 of conical springs 600 is shown in FIG. 4. It is noted that this force-displacement graph 400 is merely an example, as the values will vary depending on various characteristics of the stack 700, 800 of conical springs 600. However, the general shape of a force-displacement curve 410, representing the stiffness profile, is shown. Starting from the origin 420, the stack 700, 800 of conical springs 600 can exhibit an initial stiffness region 430 that is substantially linear. The stack 700, 800 of conical springs 600 is relatively stiff in the initial stiffness region 430. When load is reached, the force-displacement curve 410 can become substantially horizontal, representing zero or substantially zero stiffness, which is a quasi-zero stiffness region 440. The quasi-zero stiffness region 440 can allow for good vibration isolation. Continuing beyond the quasi-zero stiffness region 440, the force-displacement curve 410 can have a subsequent stiffness region 450 that is substantially linear. The stack 700, 800 of conical springs 600 is relatively stiff in the subsequent stiffness region 450.

It should be noted that there are two force-displacement curves shown in FIG. 4. A first force-displacement curve 410' represents the stack 700, 800 of conical springs 600 going from a non-loaded state to a loaded state. A second force-displacement curve 410" represents the stack 700, 800 of conical springs 600 going from a loaded state to a non-loaded state.

Figure 5:
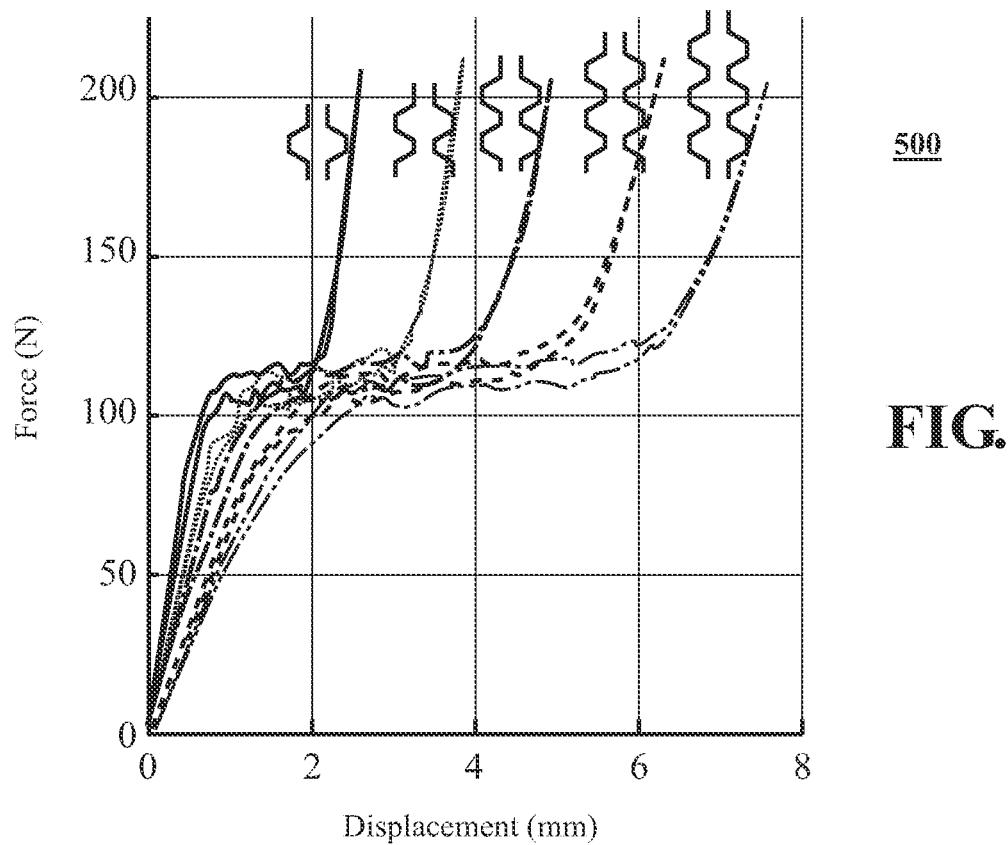
FIG. 5 is an example of a force-displacement graph of multiple stacks of conical springs.

FIG. 5 shows another example of a force-displacement graph 500 for the stack 700, 800 of conical springs 600. The force-displacement graph 500 shows the effect of adding conical springs 600 to the stack 700, 800. As more conical springs 600 are added to the stack, the quasi-zero stiffness region 440 of the force-displacement graph 400 can be extended. As is evident, the length of the quasi-zero stiffness region 440 increases as the number of conical springs 600 used in the stack increases.

Figure 9:
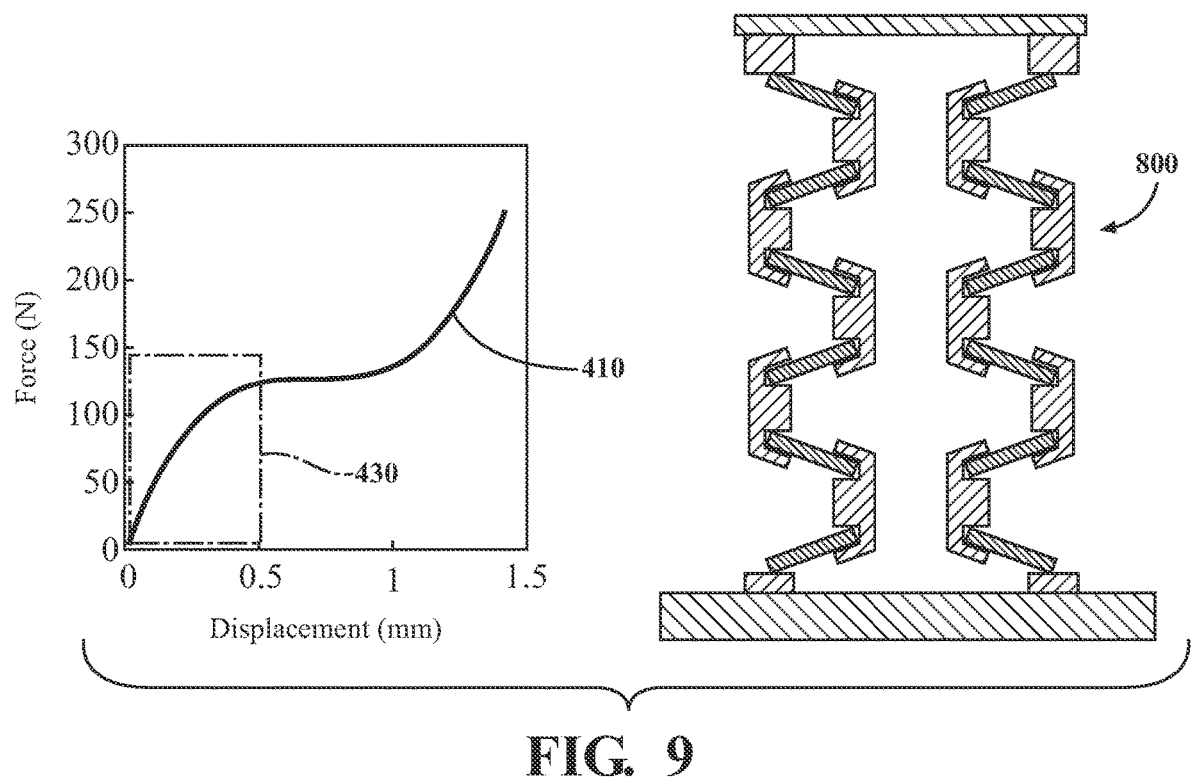
FIG. 9 is an example of the stack of conical springs at a first region of the force-displacement curve.
Figure 10:
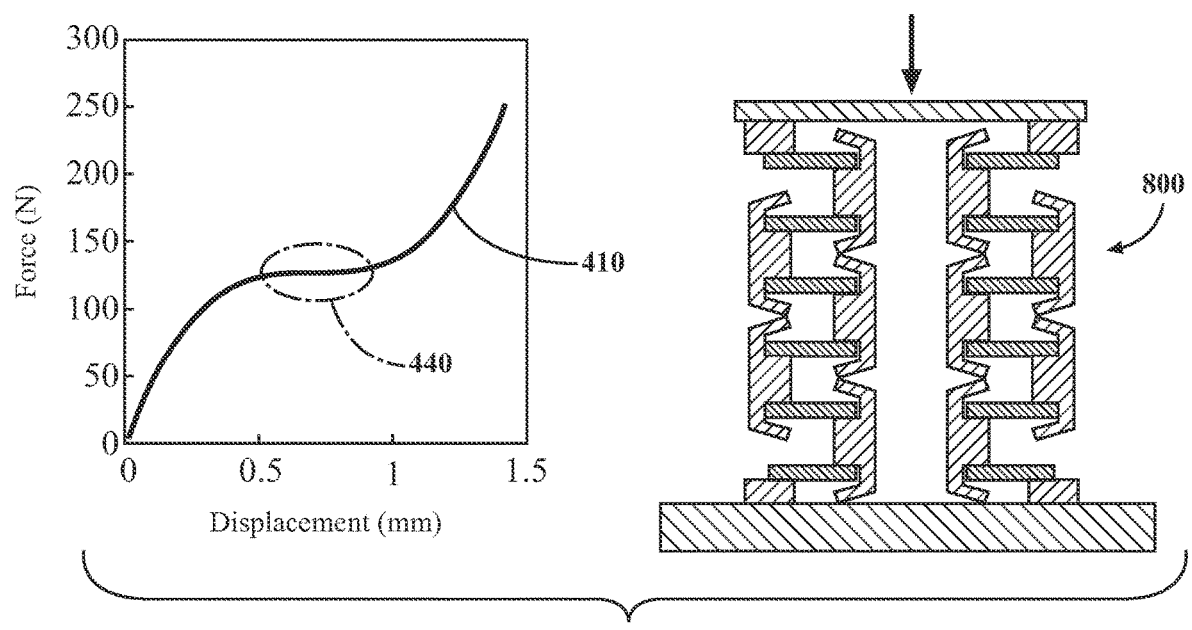
FIG. 10 is an example of the stack of conical springs at a second region of the force-displacement curve.
Figure 11:
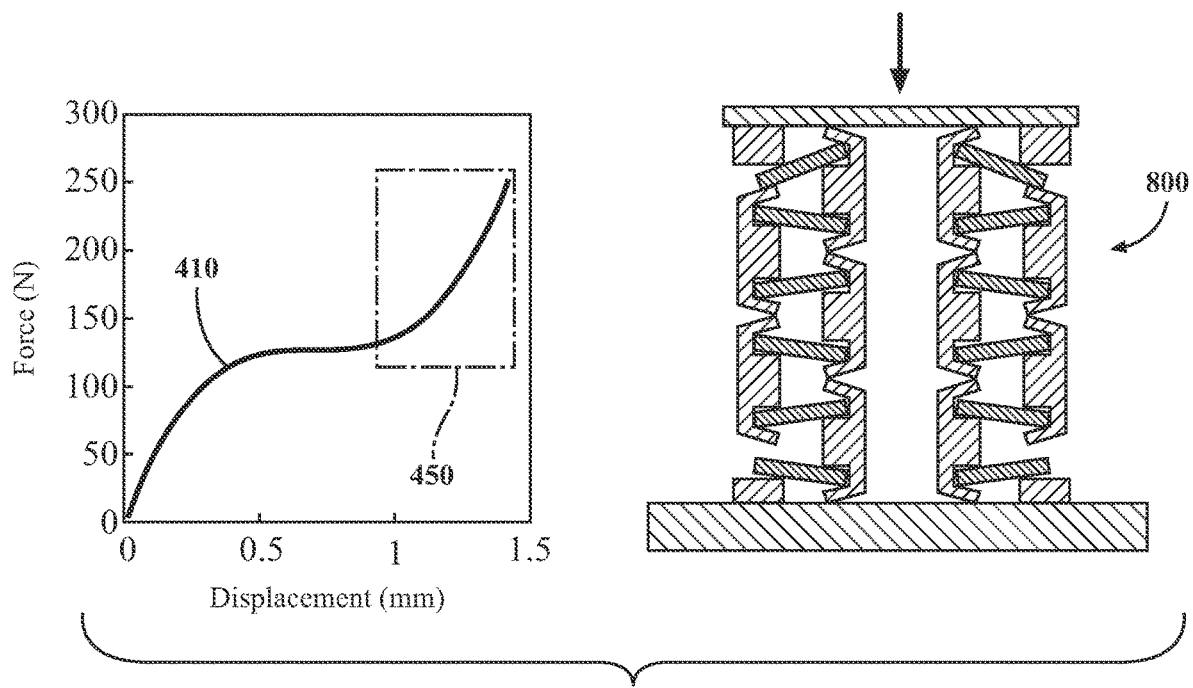
FIG. 11 is an example of the stack of conical springs at a third region of the force-displacement curve.

FIGS. 9-11 show the state of the stack of conical springs 600 of FIG. 8 in various regions of the force-displacement curve. FIG. 9 shows a representation of the stack of conical springs 600 in the initial stiffness region 430 of the force-displacement curve 410. As can be seen, the conical springs 600 can be substantially in their neutral condition. In the initial stiffness region 430, the stiffness curve is substantially linear, increasing from the origin of the graph. The stack of conical springs 600 can be relatively stiff in the initial stiffness region 430.

In FIG. 10, the stack of conical springs 600 is in the quasi-zero stiffness region 440 of the force-displacement curve 410. In the quasi-zero stiffness region 440, the force-displacement curve becomes substantially flat. The stiffness becomes very low—zero or substantially zero. The quasi-zero stiffness region 440 allows for good isolation. In the quasi-zero stiffness region 440, the conical springs 600 can become substantially flat.

In FIG. 11, the stack of conical springs 600 can be in the subsequent stiffness region 450. In the subsequent stiffness region 450, the stiffness curve can be substantially linear, increasing from the end of the quasi-zero stiffness region 440. The stack of conical springs 600 can be relatively stiff in the initial stiffness region 430. As can be seen, the conical springs 600 can become inverted relative to their initial shape. It will be appreciated that the configuration of the stack of conical springs 600 allows such inversion to occur.

It will be appreciated that the characteristics of the quasi-zero stiffness region 440 can be tuned to attain the desired performance characteristics. Such tuning can be achieved by changing the characteristics of the conical springs 600, the quantity of the conical springs 600, the arrangement of the conical springs 600, other components of the stack of conical springs 600, and/or other factors, just to name a few possibilities.

Figure 12:
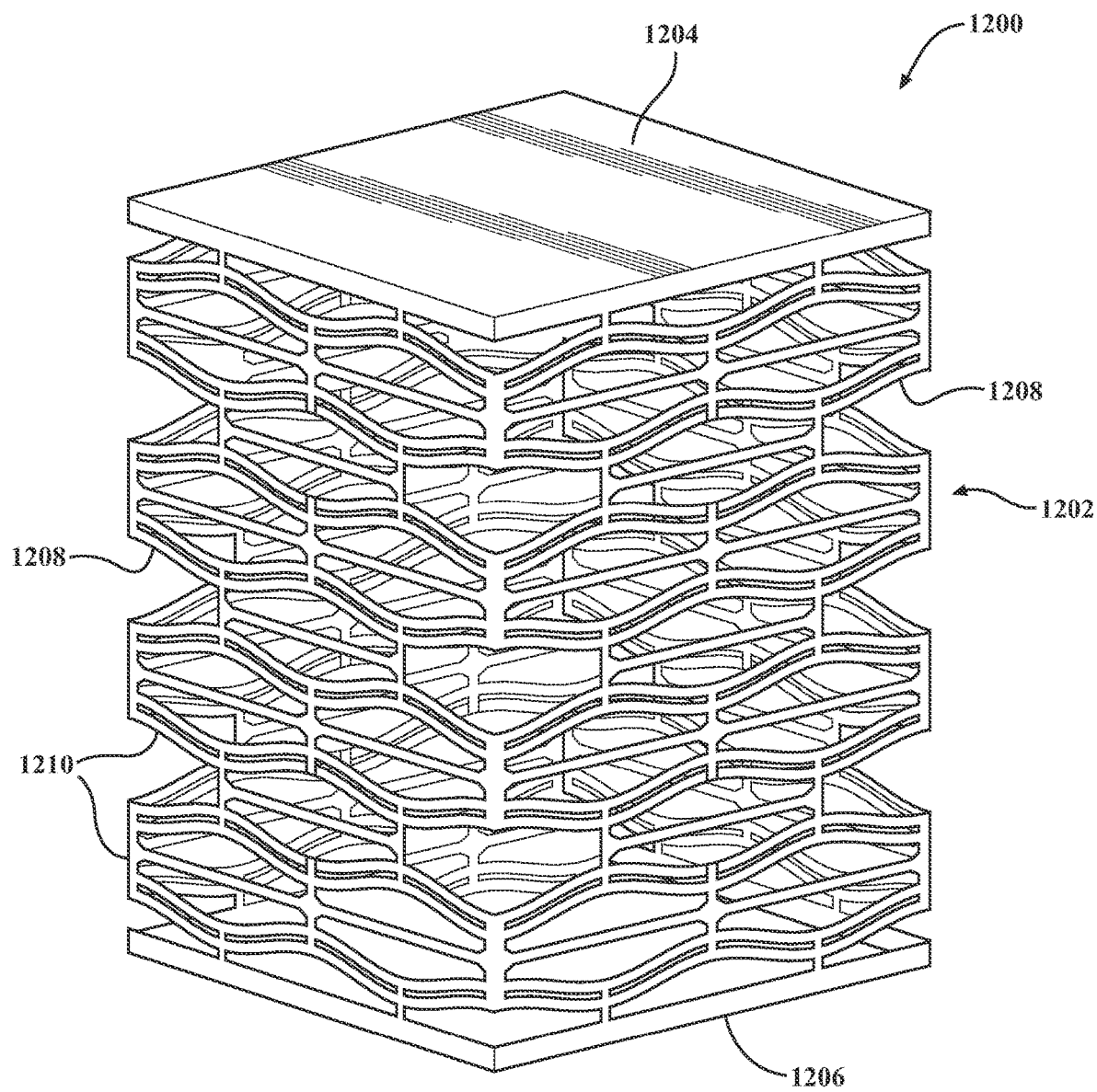
FIG. 12 is an example of a bi-stable structure.

As shown in FIGS. 12-16, the compression-type isolators 116 can be bi-stable structures 1200. For example, the bi-stable structure 1200 can be a lattice block 1202. The lattice block 1202 may be a bi-stable lattice block 1202, as will be detailed below. In one or more arrangements, as shown in FIG. 12, each individual lattice block 1202 may include a first surface 1204 and a second surface 1206, with the second surface 1206 located opposite the first surface 1204. Further, each individual lattice block 1202 may include a plurality of faces 1208, with each face 1208 having a geometrical arrangement generally similar to each of the other faces 1208. The center area of the lattice block 1202 may be hollow. While arrangements will be described herein with respect to each individual lattice block 1202 having four faces 1208, it should be understood that embodiments are not limited to each individual lattice block 1202 having four faces 1208. Each individual lattice block 1202 may have three, or five, or six, or seven or more faces 1208. The geometrical arrangement of each face 1208 of each individual lattice block 1202 may provide for a high degree of energy absorption, such that each individual lattice block 1202 may withstand repeated cycles of loading and unloading.

Figure 13:
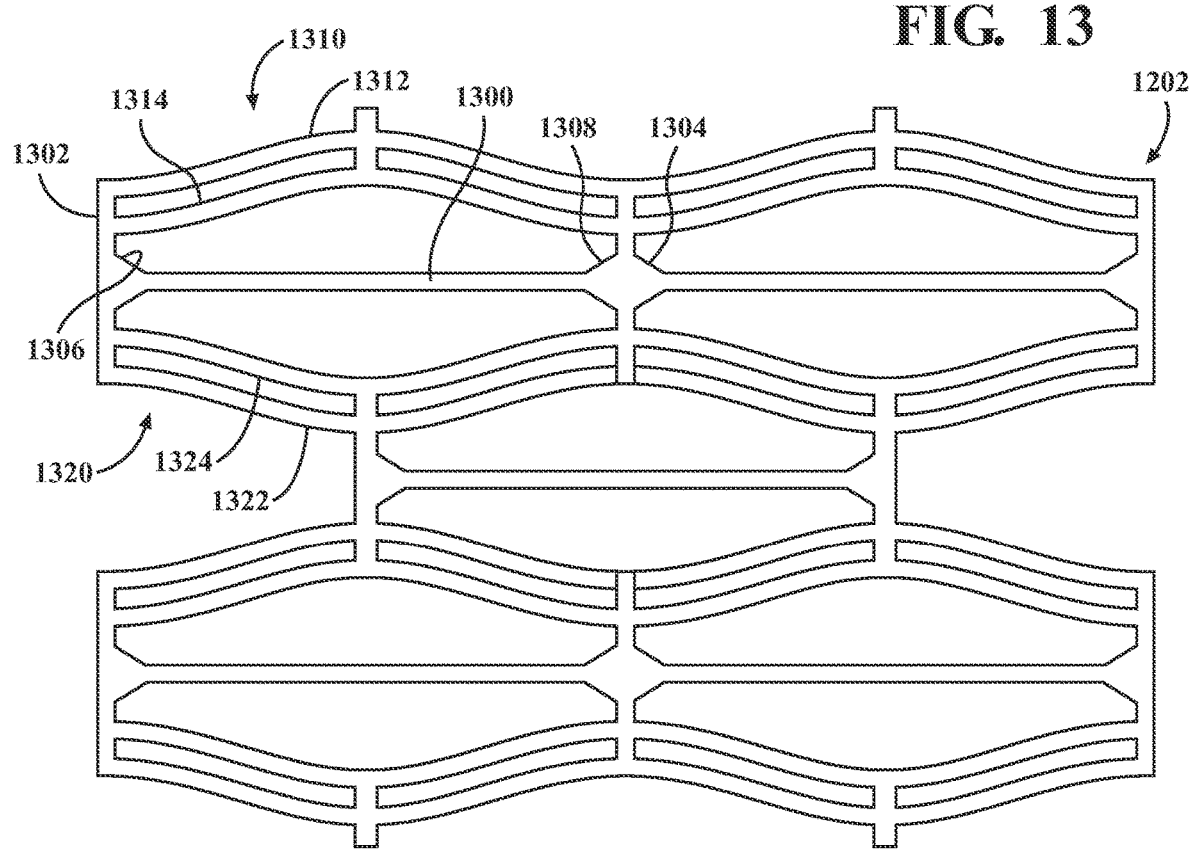
FIG. 13 is an example of a lattice block of the bi-stable structure.
Figure 14:
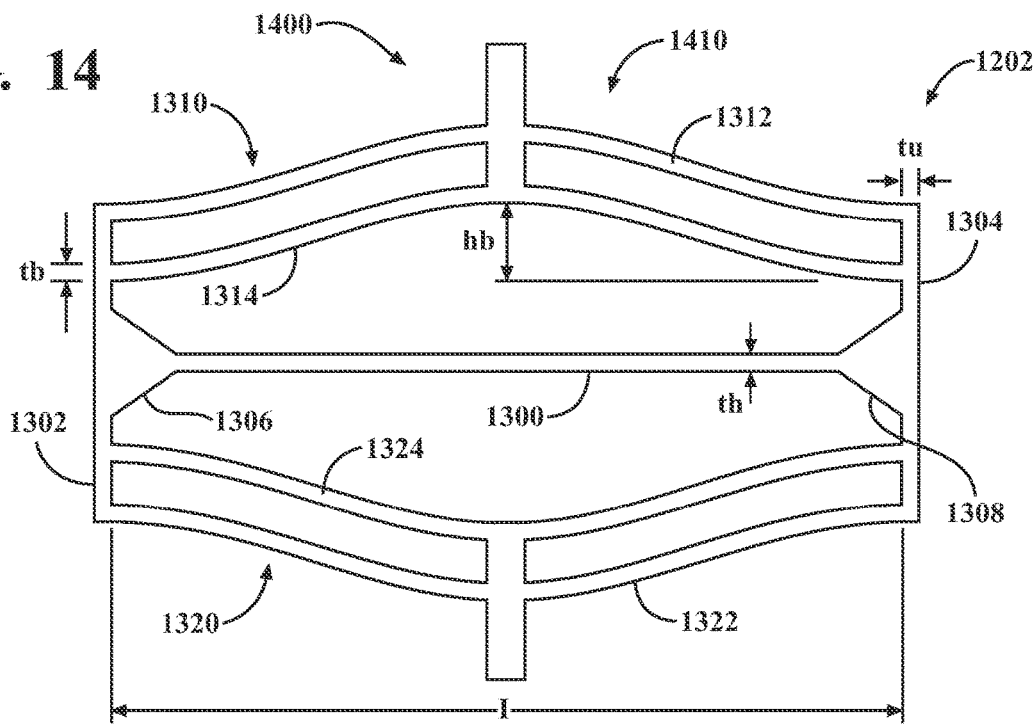
FIG. 14 is an example of a first bi-stable lattice of the lattice block of the bi-stable structure in an unloaded configuration.
Figure 15:
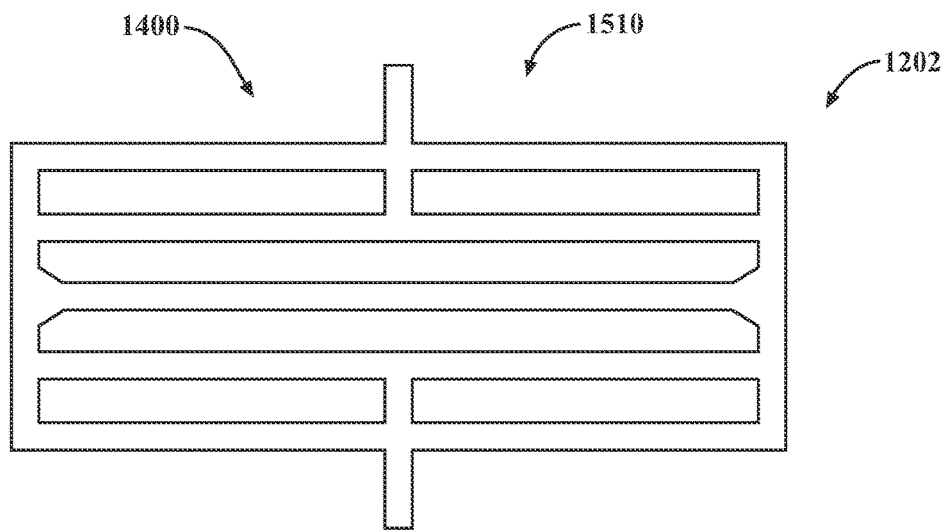
FIG. 15 is an example of the first bi-stable lattice of the lattice block of the bi-stable structure in a loaded configuration.

FIG. 13 shows an example of the individual bi-stable lattice block 1202 of FIG. 12. FIG. 14 shows an example of the individual bi-stable lattice block 1202 of FIG. 12 in an unloaded configuration. FIG. 15 shows an example of the individual bi-stable lattice block 1202 of FIG. 12 in a loaded configuration. In one or more arrangements, as shown in FIGS. 13 and 14, each individual lattice block 1202 may comprise a plurality of micro-structures 1210. Each of the plurality of micro-structures 1210 may include a horizontal wall 1300, a first vertical wall 1302, and a second vertical wall 1304. The first vertical wall 1302 is opposite the second vertical wall 1304, with the horizontal wall 1300 connecting therebetween the first vertical wall 1302 and the second vertical wall 1304. A first chamfer 1306 provides support at a junction between the first vertical wall 1302 and the horizontal wall 1300, while a second chamfer 1308 provides support at a junction between the second vertical wall 1304 and the horizontal wall 1300. A first double concentric beam 1310 connects therebetween the first vertical wall 1302 and the second vertical wall 1304 superior to the horizontal wall 1300, while a second double concentric beam 1320 connects therebetween the first vertical wall 1302 and the second vertical wall 1304 inferior to the horizontal wall 1300. The first double concentric beam 1310 is comprised of a first beam 1312 and a second beam 1314, while the second double concentric beam 1320 is comprised of a first beam 1322 and a second beam 1324.

In one or more arrangements, the micro-structure 1210, including the horizontal wall 1300, the first vertical wall 1302, the second vertical wall 1304, the first double concentric beams 1310, and the second double concentric beam 1320 can define a bi-stable lattice 1400. The bi-stable lattice 1400 is stable in both an unloaded configuration 1410, as shown in FIG. 14, and a loaded configuration 1510, as shown in FIG. 15. The bi-stable lattice 1400 is moveable between at least the unloaded configuration 1410 and the loaded configuration 1510, with each configuration defining a different shape. In the unloaded configuration 1410, the bi-stable lattice 1400 is not subjected to a load. In the loaded configuration 1510, the bi-stable lattice 1400 is subjected to a load. The first and second double concentric beams 1310, 1320 have a height $h_b$, in the unloaded configuration 1410. The first and second double concentric beams 1310, 1320 have a height less than $h_b$ in the loaded configuration 1510. The range of heights for the first and second double concentric beams 1310, 1320 in the loaded configuration 1510 is between $h_b$ and 0.

In one or more arrangements, each individual bi-stable lattice 1400 possesses a stiffness value. The stiffness value of each individual bi-stable lattice 1400 is a result of a shape of the bi-stable lattice 1400, and parameters of the bi-stable lattice 1400, including but not limited to a thickness $t_b$ of the first beam 1312,1322, and second beam 1314,1324, a thickness $t_h$ of the horizontal wall 1300, a thickness $t_v$ of the vertical walls 1302,1304, a length l of the bi-stable lattice 1400, and the height $h_b$ of the first and second double concentric beams 1310,1320, as shown in FIG. 14. The stiffness value for each individual bi-stable lattice 1400 may be a positive value or a negative value. A positive stiffness value is defined as when force is applied to an object (such as the bi-stable lattice 1400), a displacement is observed in same direction as the force applied. Objects having positive stiffness value push back and oppose force applied to the object. A negative stiffness is defined as when force is applied to the object, the displacement is observed in an opposite direction as the force applied. Objects having negative stiffness value display vibrational and acoustical absorbance properties because the objects assist rather than resist deformation as a result of the force applied. An overall stiffness values for the plurality of bi-stable lattices 1400 may be a positive or negative value. In one or more arrangements, the plurality of bi-stable lattices 1400 may display an overall negative stiffness value, thereby facilitating vibrational energy and acoustical noise absorbance. The bi-stable structure 1200 having an overall negative stiffness value enhances reduction in vibrational energy and acoustical noise experienced during loading and unloading.

Figure 16:
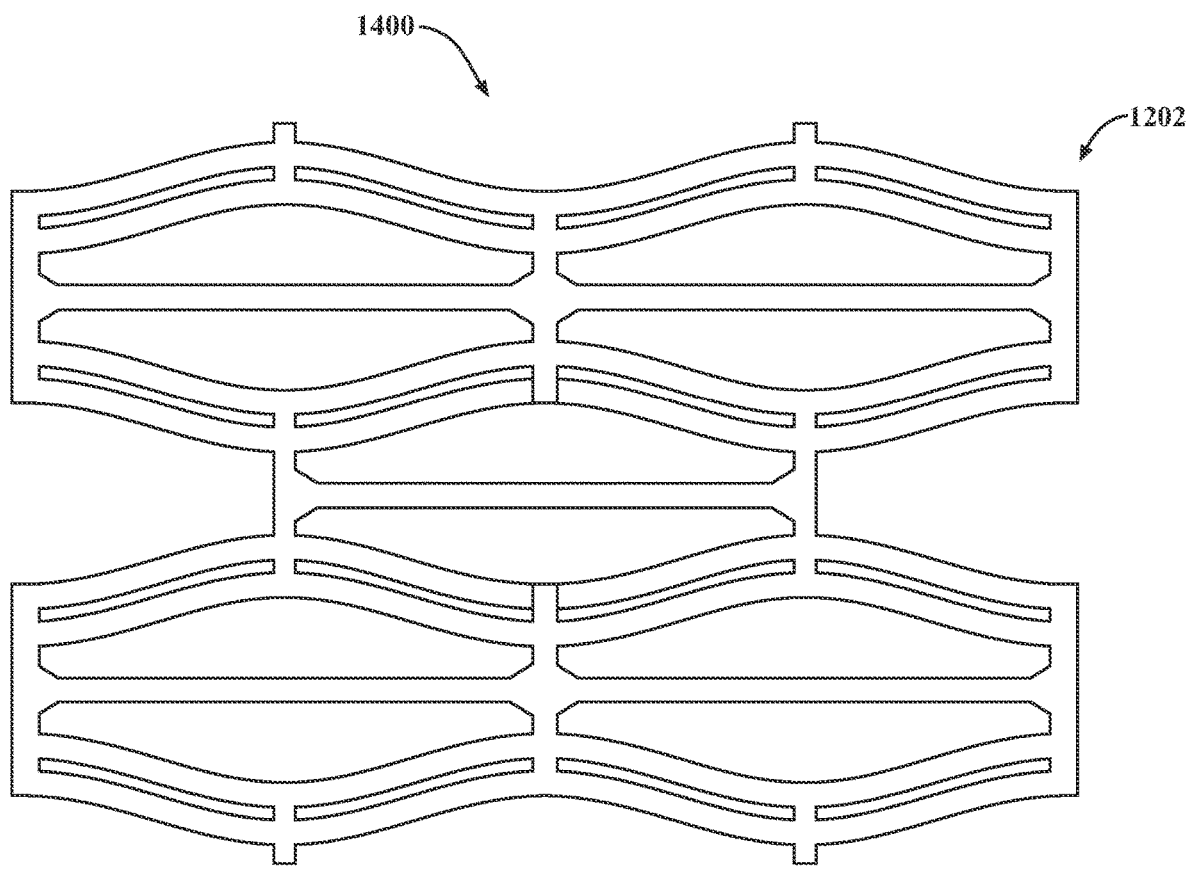
FIG. 16 is an example of a second bi-stable lattice of the lattice block of the bi-stable structure.

In one or more arrangements, each of the plurality of bi-stable lattices 1400 may possess unique stiffness values $S_1$-$S_N$. FIG. 16 is a view of another example of a bi-stable lattice 1400. For exemplary purposes only, as shown in FIG. 16, the bi-stable lattice 1400 may possess an increased thickness $t_b$ of the first beam 1312,1322 and second beam 1314,1324; increased thickness $t_h$ of the horizontal wall 1300; and increased thickness $t_v$ of the vertical walls 1302, 1304. Additionally, the bi-stable lattice 1400 may possess decreased height $h_b$ of the first and second double concentric beams 1310, 1320. Alterations exemplified in the bi-stable lattice 1400 of FIG. 16 may increase a stress threshold, initial stiffness, and energy absorbance in comparison to the bi-stable lattice 1400 of FIG. 14. The parameters of the bi-stable lattice 1400 in FIG. 16 may be altered without affecting an overall size of the bi-stable lattice 1400, or the shape of the bi-stable lattice 1400. Alternatively, alterations to the bi-stable lattice 1400 may include changes to the overall size of the bi-stable lattice 1400 and changes in the shape of the bi-stable lattice 1400.

It will be appreciated that the above-described lattice blocks are not the only configurations that can be used. Thus, arrangements described herein are not limited to these particular lattice blocks.

Further, it will be appreciated that the bi-stable structures 1200 described herein can exhibit the same or similar characteristics as the stacks 700, 800 of conical springs 600. For example, the bi-stable structures can be configured to exhibit a non-linear stiffness profile, which can include a region of quasi-zero stiffness. The non-linear stiffness profile of the bi-stable structures 1200 can be the same as the non-linear stiffness profile shown in FIG. 4. Moreover, the bi-stable structures 1200 can be configured to compress at a substantially constant crush force in response to a force applied by the rotating machine. Further, the bi-stables structures 1200 can be formed as a unitary structure with the housing 114. Such a unitary structure can be achieved by, for example, three dimensional printing.

It will be appreciated that the arrangements described herein can provide numerous benefits, including one or more of the benefits mentioned herein. For example, the arrangements described herein can reduce vibrations within a rotating machine and stabilize the rotating machine within the housing. The arrangements described herein can also reduce the rate of wear of the rotating machine. The arrangements described herein can extend the operational life of the rotating machine. Moreover, the arrangements described herein can also reduce the occurrence of mechanical failures within the rotating machine.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . ," as used herein refers to and encompasses any and all possible combinations of one or more of the associated listed items. As an example, the phrase "at least one of A, B, and C" includes A only, B only, C only, or any combination thereof (e.g. AB, AC, BC, or ABC). As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some examples, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope of the invention.

What is claimed is:

1. A rotating machine system comprising:
   a rotating machine;
   a housing including an inner surface, the housing surrounding at least a portion of the rotating machine, the inner surface of the housing being spaced from the rotating machine such that a space is defined therebetween; and
   a plurality of vibration isolators being positioned in the space and being operatively connected to the rotating machine and to the inner surface of the housing, the plurality of vibration isolators being a plurality of compression-type vibration isolators and having a stiffness profile including a quasi-zero stiffness region.

2. The rotating machine system of claim 1, wherein the plurality of vibration isolators are configured to compress at a substantially constant crush force in response to a force applied by the rotating machine.

3. The rotating machine system of claim 1, wherein the plurality of vibration isolators are arranged in a row in a circumferential direction about the rotating machine.

4. The rotating machine system of claim 1, wherein the plurality of vibration isolators are arranged substantially radially relative to an axis of rotation of the rotating machine.

5. The rotating machine system of claim 1, wherein the plurality of vibration isolators are arranged in a plurality of rows, and wherein the plurality of rows are spaced from each other along an axis of rotation of the rotating machine.

6. The rotating machine system of claim 1, wherein the plurality of vibration isolators are distributed non-uniformly in a circumferential direction.

7. The rotating machine system of claim 6, wherein the plurality of vibration isolators are distributed with a greater concentration in a lower region of the space than in an upper region of the space.

8. The rotating machine system of claim 1, wherein the rotating machine is suspended in the housing by the plurality of vibration isolators.

9. The rotating machine system of claim 1, wherein the plurality of vibration isolators include a plurality of stacks of conical springs.

10. The rotating machine system of claim 1, wherein the plurality of vibration isolators include a plurality of bi-stable structures.

11. The rotating machine system of claim 1, wherein the rotating machine is one of a motor, turbine, or generator.

12. A rotating machine system comprising:
    a rotating machine;
    a housing including an inner surface, the housing surrounding at least a portion of the rotating machine, the inner surface of the housing being spaced from the rotating machine such that a space is defined therebetween; and
    a plurality of vibration isolators being positioned in the space and being operatively connected to the rotating machine and to the inner surface of the housing, the plurality of vibration isolators being a plurality of compression-type vibration isolators, the plurality of vibration isolators having a stiffness profile including a quasi-zero stiffness region and being configured to compress at a substantially constant crush force in response to a force applied by the rotating machine, and the plurality of vibration isolators being one of: a plurality of stacks of conical springs or a plurality of bi-stable structures.

13. The rotating machine system of claim 12, wherein the plurality of vibration isolators are arranged in a row in a circumferential direction about the rotating machine.

14. The rotating machine system of claim 12, wherein the plurality of vibration isolators are arranged substantially radially relative to an axis of rotation of the rotating machine.

15. The rotating machine system of claim 12, wherein the plurality of vibration isolators are arranged in a plurality of rows, and wherein the plurality of rows are spaced from each other along an axis of rotation of the rotating machine.

16. The rotating machine system of claim 12, wherein the rotating machine is suspended in the housing by the plurality of vibration isolators.

17. The rotating machine system of claim 12, wherein the plurality of vibration isolators are a plurality of bi-stable structures, and wherein the plurality of bi-stable structures are formed as a unitary structure with the housing.

18. The rotating machine system of claim 12, wherein the rotating machine is one of a motor, turbine, or generator.

19. A rotating machine system comprising:
    a rotating machine;
    a housing including an inner surface, the housing surrounding at least a portion of the rotating machine, the inner surface of the housing being spaced from the rotating machine such that a space is defined therebetween; and
    a plurality of vibration isolators being positioned in the space and being operatively connected to the rotating machine and to the inner surface of the housing, the plurality of vibration isolators being a plurality of compression-type vibration isolators distributed non-uniformly in a circumferential direction and being configured to compress at a substantially constant crush force in response to a force applied by the rotating machine, and the plurality of vibration isolators being one of: a plurality of stacks of conical springs or a plurality of bi-stable structures.

20. The rotating machine system of claim 19, wherein the plurality of vibration isolators are distributed with a greater concentration in a lower region of the space than in an upper region of the space.

* * * * *